April 15, 1969  C. E. BARRINGTON  3,438,464
WHEEL BRAKE DISK DRIVE KEY
Filed Nov. 30, 1966

INVENTOR.
CHARLES E. BARRINGTON
BY
Oldham & Oldham
ATTYS.

Patented Apr. 15, 1969

3,438,464
WHEEL BRAKE DISK DRIVE KEY
Charles E. Barrington, Stow, Ohio, assignor to The Goodyear Tire & Rubber Company, Akron, Ohio, a corporation of Ohio
Filed Nov. 30, 1966, Ser. No. 598,101
Int. Cl. F16d 55/00, 65/14, 13/52
U.S. Cl. 188—72                                   5 Claims

ABSTRACT OF THE DISCLOSURE

This invention relates to a wheel brake disk drive key utilized to achieve a driving action on the rotating friction members in a disk brake. More specifically, the invention comprises a plurality of stamped metal keys resiliently mounted in slots on a rotatable wheel, whereby the keys are adapted to receive ears extending from rotatable friction members of a disk brake whereby the keys transmit the torque forces from the wheel to the ears of the friction members to thus eliminate costly machining of the slots in the rotating wheel to directly receive the ears of the rotating friction members.

Prior art

Heretofore it has been well known that disk brakes are conventionally utilized, particularly with wheels, such as the wheels of an aircraft. In the usual disk brake design, a plurality of stationary disks are interlevered with a plurality of rotating disks. A problem arises in the fact that all the disks must be slidable axially with respect to the axle, and this conventionally is done for the rotating disks by having a plurality of radially outwardly directed ears slidably engaging in mating axially directed slots in the rotating wheel. However, because of the large torques involved, the slots of the wheel must be carefully machined and have sufficient strength to receive the ears in close spaced tolerance relationship therewith so that there will not be any structural damage because of inertial forces and banging of parts into one another caused by the braking action. Heretofore it has been found that the machining of the slots in the wheel is expensive, and further, if there are any excessive torque loadings which causes damage to the slots, the entire wheel assembly must be replaced, or remachined.

Objects of invention

Thus, it is the general object of the present invention to avoid and overcome the foregoing and other difficulties of and objections to prior art practices by the provisions of a stamped metal key to be resiliently mounted in receiving slots in the wheel, which slots require very little machining because of the resilient mounting nature and carefully stamped close tolerance configuration of the keys.

A further object of the invention is to provide a resilient key for mounting in the slot of a rotating member to receive an extending ear of a rotatable brake disk whereby no external holding means are required to position the key with respect to the slot, and wherein the key also resiliently holds the ear of the brake disk relative thereto to prevent rattle during nonapplication of the brakes.

The aforesaid objects of the invention and other objects which will become apparent as the description proceeds are achieved by providing in combination a rotatable member having a horizontally directed circular endless flange with a plurality of U-shaped key slots in the flange, a plurality of stationary brake disks, a plurality of rotatable brake disks interlevered between the stationary disks, each rotatable disk having a plurality of radially outwardly extending ears mating with the slots in the flange of the rotatable member which is characterized by stamped metal strip means resiliently mounted in the slots of the flange to protect the sides of the slots and adapted to engage the ears of the rotatable disks.

For a better understanding of the invention reference should be had to the accompanying drawings wherein.

Description of invention

Figure 1:
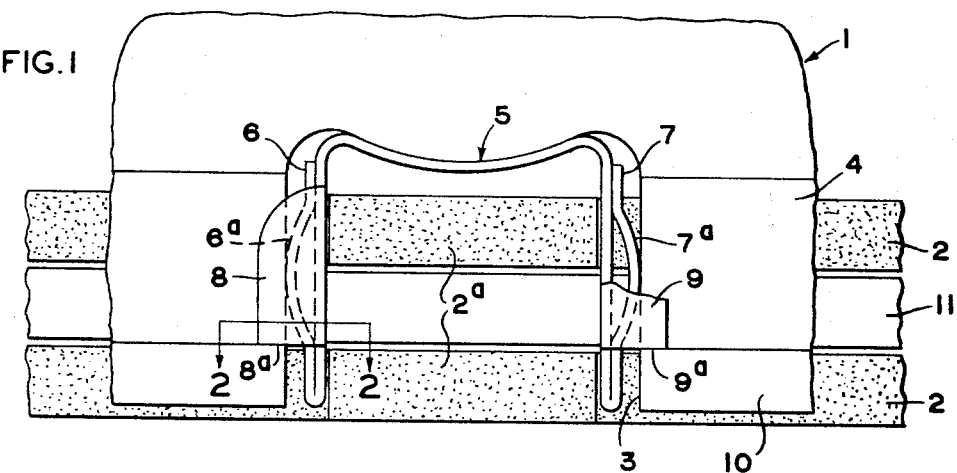
FIG. 1 is an enlarged, broken-away plan view of the key associated with the slot, and the ears of the rotating disks extending into relationship therewith.

With reference to the form of the invention illustrated in the drawings, the numeral 1 indicates generally a partially broken-away wheel housing which is rotatably secured to an axle (not shown in the drawing). The wheel is typically an airplane wheel cast from a light metal such as magnesium or aluminum or alloys thereof. In order to provide a slidable locking relationship of a plurality of rotatable brake disks, each indicated generally by numeral 2, the inside circumference of the wheel housing 1 is axially directed to form an annular flange and notched to form a plurality of circumferentially spaced U-shaped key slots 3. In one best known form of the typical airplane wheel, the slots 3 are cut through the entire thickness of the axially directed flange and formed into a U-shape, as best seen in FIG. 1. The flange and the U-shaped slots 3 are formed as an integral cast part of the wheel 1.

Figure 3:
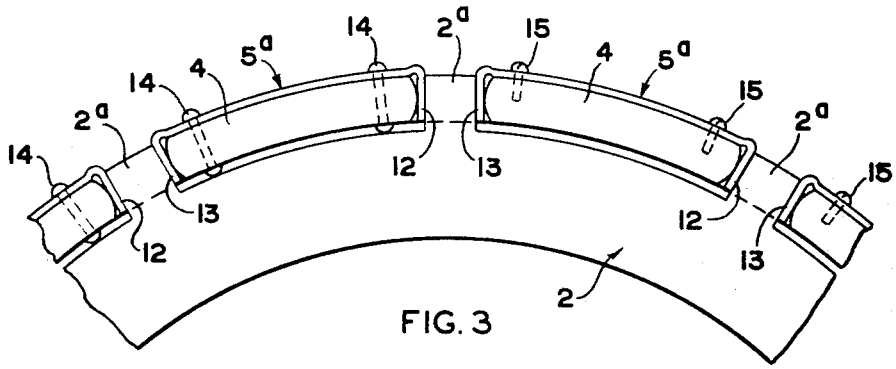
FIG. 3 is a side elevational view of a modified embodiment of the invention which also is resiliently mounted in position, but which embodiment can be riveted in place.

As best seen in FIG. 3, the rotatable brake disks 2 have a plurality of radially outwardly extending ears 2a which are circumferentially spaced in exactly the same relationship as the keys or slots 3, and hence are slidably received therein and extend radially to be in alignment therewith, as shown, all of which is substantially conventional in the art. Since the wheel 1 rotates, the brake disks 2 rotate therewith because of the slidable engagement of the ears 2a into the slots 3.

In the prior art, it was necessary to actually machine the slots or key ways 3 so that there would be a very close circumferential tolerance sliding relationship between the ears or radially extending keys of the brake disks. This is both expensive and time consuming. Thus, to overcome this problem, the invention contemplates positioning of a stamped metal strip indicated generally by numeral 5 in a substantially resilient relationship with each slot or key way 3 so as to thereby form an accurate circumferential tolerance relationship with the particular radially extending ear of the brake disk, and substantially eliminate the necessity for machining the slots 3.

Figure 2:
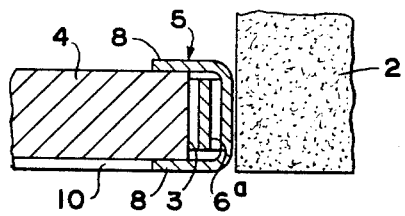
FIG. 2 is an enlarged, cross sectional elevation of the key associated with the slot and the brake disk as taken on line 2—2 of FIG. 1.

In a preferred embodiment of the invention as shown in FIG. 1, the strip 5 comprises a continuous length stamped to the desired U-shape with each end folded back on itself at 6 and 7, respectively, and bowed slightly on the folded back portion at 6a and 7a, respectively, so as to provide a resilient engaging relationship between the sides of the slot 3 and the strip 5. Also, in order to securely fit strip 5 into relationship with its respective slot 3, each side of strip 5 is stamped with a pair of similar wings 8 and 9, respectively, which fold outwardly to form a U-shape of their own, as best seen in FIG. 2 so that the top flat portion, 8a and 9a, respectively, on each wing will fit under the edge of a small lip 10 formed on the axially outer edge of the flange 4. Also, preferably, the bottom of strip 5 is also slightly bowed to give a resilience tending to force strip 5 out thus in effect biasing the edges 8a and 9a of flanges 8 and 9 against their respective portions of lip 10. In this manner, the strip 5 is thus resiliently biased from the sides by the bowed portions 6a and 7a of the sides and also by the bottom forcing edges 8a and 9a of the flanges 8 and 9 against lip 10. The strip 5 is thus very securely held in place, and provides a very convenient, and low cost method for accurately finishing or determining the size of slots 3 to a very close tolerance fit with the keys or ears 2a extending from the rotatable brake disks 2.

In practice, it has been found that a relatively hard stainless steel very satisfactorily meets the desired structural features of the invention when used on a smaller brake for a smaller aircraft. However, when utilizing the structure in FIG. 1 on a larger brake, the strip 5 should probably be made from a spring type metal which will not deform, but maintain its resilience to a much higher degree than the stainless steel. Further, it has been found that the spring-like features of the bowed side portions allows the actual resilient griping of the ears 2a so as to eliminate disk rattle during a non-braking operation, but allows the disks to slide axially to achieve the desired braking action without any binding, or the like. It is convenient to mold the wheel 1 so as to form the lip 19 on the flange 4. In fact, the lip could be provided on both sides of flange 4, and may conveniently be done so in certain instances so that both edges of each set of ears may rest thereagainst. In the embodiment illustrated, however, the lip 10 is formed on only one side, this being the radially outward side.

Naturally, in the usual manner, the stationary disks 11 are interlevered between the rotating disks 2 so as to achieve the desired conventional disk braking action.

FIG. 3 illustrates a slight modified form of the invention wherein a plurality of stamped metal strips 5a are mounted to the radially outward surface of flanges 4 so as to have a width of substantially the depth of respective slots 3. The strips 5a are elongated U-shaped and have end portions 12 and 13, respectively, which extend down over and substantially cover the sides of slots 3. Thus, it should be understood, that it takes at least two strips 5a to cover both sides of each respective slot 3. These strips 5a are also formed from suitable metal so that the ends 12 and 13 are bent or bowed slightly inwardly so as to slide down over the arcuate length between adjacent slots 3 in a pinching action so as to in effect be resiliently held in place on the respective flanges and provide the same resilient griping of the keys or ears 2a on the brake disk 2. However, if it is necessary to insure positive attachment of strips 5a, since there is no contact with the lip as in the embodiment of FIG. 1, suitable rivets 14 can be utilized for this purpose which passing through the radial thickness of the flange 4, as seen on the left side of FIG. 3, or suitable screws 15 can be threadably received in the flange 4, as illustrated on the right hand side of FIG. 3.

It should also be stressed in each of the embodiments shown in FIGS. 1 and 3, that the precision tolerance of the respective slots 3 is achieved by a stamped metal insert, at least partially resiliently held in position by the formation of the insert itself. These inserts can be made for extremely low cost, or are readily replaceable if wear should occur, and further they eliminate the possibility of damage to the slots themselves. Further, because of the construction as illustrated, a maximum rubbed outer diameter is achieved on the friction disks themselves.

In accordance with the patent statutes, only one best known embodiment of the invention has been illustrated and described in detail, it is to be particularly understood that the invention is not limited thereto or thereby, but that various modifications and alterations could fall within the scope of the invention.

What is claimed is:

1. In a brake a rotatable member having a horizontally directed circular endless flange with a plurality of U-shaped key slots in said flange, a plurality of stationary brake disks, a plurality of rotatable brake disks interlevered between the stationary brake disks, each rotatable disk having a plurality of radially directed keys mating with the slots in said flange of the rotatable member where the sides of the key slots take torque exerted thereon by the rotatable brake disks upon brake application which is characterized by stamped metal strip means resiliently engaging the lateral sides of the slots of the flange in flat face to face relation to cover and protect the sides of the slots, and adapted to engage the keys of the rotatable disks in flat face to face relation to receive and transmit all disk torque therethrough, and means to prevent axial displacement of the strip means relative to the flange.

2. A combination according to claim 1 where the metal strip means are made from a substantially resilient metal and are formed so as to resiliently and snugly engage the edges of the keys of the rotatable disks while also engaging the sides of the slots.

3. A combination according to claim 1 wherein the flange of the rotatable member has a raised lip thereon, and where said last mentioned means is a flange projecting from said strip and engaging the lip to resiliently hold the strip means in axial position relative to their respective slot in the flange.

4. A combination according to claim 1 wherein each of the stamped metal strip means is substantially U-shaped to fit in complementary relationship in a respective U-shaped slot in the flange with each end thereof folded back onto itself in a bowed relationship to achieve a resilient engagement with the sides of the slot, and wherein the flange of the rotatable member is provided with a raised lip, and where the last said means are flanges extending from the sides of each strip means to engage beneath the lip on the flange of the rotatable member to assist in holding said strip means in position with respect to its respective slot.

5. A combination according to claim 1 wherein the metal strip means are substantially U-shaped with the base of the U extending between adjacent slots and the legs of each U extending into and resiliently engaging the adjacent edges of adjacent slots, whereby there are sufficient metal strips to engage the adjacent edges of all of the slots in the flange of the rotatable members.

References Cited

UNITED STATES PATENTS

| | | | |
|---|---|---|---|
| 1,415,841 | 5/1922 | Seitz | 192—69 |
| 2,616,526 | 11/1952 | Hovey et al. | 188—72 X |
| 3,191,735 | 6/1965 | Wauak. | |
| 3,233,704 | 2/1966 | Strain et al. | |

GEORGE E. A. HALVOSA, *Primary Examiner.*

U.S. Cl. X.R.

188—205; 192—70.2; 287—53